US012623366B2

(12) United States Patent
Stevens

(10) Patent No.: US 12,623,366 B2
(45) Date of Patent: May 12, 2026

(54) CUTTING GUIDE FOR CUTTING FIBROUS OR THICK SHEET MATERIALS

(71) Applicant: Lee Hiram Stevens, Erie, CO (US)

(72) Inventor: Lee Hiram Stevens, Erie, CO (US)

( * ) Notice: Subject to any disclaimer, the term of this patent is extended or adjusted under 35 U.S.C. 154(b) by 0 days.

(21) Appl. No.: 19/412,252

(22) Filed: Dec. 8, 2025

(65) Prior Publication Data

US 2026/0102937 A1 Apr. 16, 2026

Related U.S. Application Data

(63) Continuation-in-part of application No. 17/974,705, filed on Oct. 27, 2022, now Pat. No. 12,508,728.

(60) Provisional application No. 63/278,662, filed on Nov. 12, 2021, provisional application No. 63/278,654, filed on Nov. 12, 2021.

(51) Int. Cl.
*B26B 9/00* (2006.01)
*B26B 3/08* (2006.01)
*B26B 29/02* (2006.01)
*B26B 29/06* (2006.01)

(52) U.S. Cl.
CPC ................ *B26B 29/06* (2013.01); *B26B 3/08* (2013.01); *B26B 9/00* (2013.01); *B26B 29/02* (2013.01)

(58) Field of Classification Search
CPC .. B26B 29/06; B26B 3/08; B26B 9/00; B26B 29/02
See application file for complete search history.

(56) References Cited

U.S. PATENT DOCUMENTS

| | | | | | |
|---|---|---|---|---|---|
| 2,642,674 | A * | 6/1953 | Schell, Jr. | E04F 21/22 | 52/749.11 |
| 5,191,716 | A * | 3/1993 | Anderson | B43L 7/00 | 33/483 |
| 5,353,508 | A * | 10/1994 | Baker | B26B 29/06 | 30/294 |
| 5,471,749 | A * | 12/1995 | Brady | B43L 12/00 | 33/562 |
| 5,806,391 | A * | 9/1998 | Schelli, III | B26B 29/06 | 30/286 |
| 5,924,348 | A * | 7/1999 | Schelli, III | B26B 29/06 | 30/294 |
| 6,018,880 | A * | 2/2000 | Wiggins | B26B 29/06 | 33/483 |
| 6,195,904 | B1 * | 3/2001 | Greer | E04F 21/0076 | 33/526 |
| 7,827,701 | B2 * | 11/2010 | Wharton | B43L 13/201 | 33/562 |
| 12,508,728 | B2 * | 12/2025 | Stevens | B26B 5/00 | |
| 2003/0088992 | A1 * | 5/2003 | Nelson | E04D 15/04 | 33/640 |

(Continued)

FOREIGN PATENT DOCUMENTS

| | | | | |
|---|---|---|---|---|
| GB | 2310158 A * | 8/1997 | | B26B 29/06 |
| GB | 2379606 A * | 3/2003 | | B26B 29/06 |

*Primary Examiner* — Yaritza Guadalupe-Mccall
(74) *Attorney, Agent, or Firm* — Leyendecker & Lemire

(57) ABSTRACT

A cutting guide for laying out, squaring and facilitating the cutting of fibrous batt insulation materials used in building construction is described. The cutting guide permits the substantially uniform compression of underlying materials and provides a straight edge along which a knife can be slid to uniformly cut the underlying material. A handle is provided to facilitate the even application of pressure along the guides length.

19 Claims, 13 Drawing Sheets

(56) References Cited

U.S. PATENT DOCUMENTS

| | | | | |
|---|---|---|---|---|
| 2023/0150153 | A1* | 5/2023 | Stevens | B26B 5/00 83/13 |
| 2024/0416542 | A1* | 12/2024 | LaRocca | B26B 5/002 |

* cited by examiner

CUTTING GUIDE FOR CUTTING FIBROUS OR THICK SHEET MATERIALS

RELATED APPLICATIONS

This application claims the benefit of and hereby incorporates by reference U.S. patent application Ser. No. 17/974,705 filed Oct. 27, 2022 entitled Knife and Cutting Guide for Cutting Fibrous or Thick Sheet Materials, which claims the benefit and incorporates by reference two U.S. Provisional Patent Applications each having the same inventor as the present application: namely, application No. 63/278,662 filed on Nov. 12, 2021 and having the title “Insulation Knife” and application No. 63/278,654 filed on Nov. 12, 2021 and having the title “Batt Cutting Guide”.

BACKGROUND

Energy costs and codes have created a heightened awareness of insulation products and performance. Mineral wool batt-type insulating products are increasingly being used over conventional fiberglass batting, as are various foam board insulations. While the cutting of conventional fiberglass batting can be challenging and put undue strain on an installer’s hands and wrists, both these alternative insulating materials are harder to cut with the conventional prior art knives used by most insulation installers.

Cutting any type of insulation product with a knife involves angling the blade into the material, and drawing the blade through the material, towards the user’s body. Conventional prior art knives typically have a blade on axis or generally parallel with the handle, which requires the user to flex the wrist at an extreme angle in order to align the blade into the cut to be made. This puts a significant strain on the wrist, before even starting the cutting action. The pull force is directed along the axis of the handle or grip, so that the user must squeeze tightly to maintain a grip on the handle, and prevent the hand from sliding lengthwise off of the handle, while pulling through the cut. It is not uncommon to see insulation installers hold a fiberglass batt up against a wall stud, and draw the knife downwardly. The knuckles are thereby arranged nearly vertically and the wrist is relatively relaxed, but the gripping action must still be forceful, to prevent the hand from slipping along the axis of the knife handle.

Ergonomic knives have been introduced, in which the cutting edge emanates from the bottom of a grip whose longitudinal axis (or grip line) is angled top forward, relative to the cutting edge. For cutting thicker materials, this requires a significant forward flex of the wrist to engage the blade to the full depth required. This rotational force results in excessive wrist strain while in use cutting thicker materials.

Insulation saws have been devised, particularly for cutting mineral wool batts and foam board. The grips are typical of handsaws, in that the grips are located above the cutting edge of the blade, and canted forward at an acute angle of about 60 degrees to the blade edge. On the pull stroke, the user’s grip is more or less square to the direction of force applied. This means that the fingers can curl around the front side of the grip or handle, and the pull force is taken at the first knuckles of all four fingers together. The total force applied is only the pull force, and does not require an extra squeezing or compression force to keep the hand from sliding in the direction of the pull. Sawing requires extra time and energy, to repeatedly move the arm back and forth. A law of physics states that energy expended is proportional to surface area created, and the foam sawdust particles generate a far greater surface area than a knife cutting cleanly through the same material. Another liability is that the insulation particles created by the saw cutting process may also be both a nuisance and unhealthy to breathe.

To efficiently cut lofted fibrous batt insulation, such as fiberglass and mineral wool, they must be compressed or otherwise restrained while cutting. This allows the knife blade to cut through the fibers, as opposed to snagging, dragging and clumping the fibers. The thicker the batt, the greater the problem, and the greater the need to compress the fibers to enable an efficient cut to be made. It is common in the trades to compress the batt with the fingers, and hand pressure. This exposes the fingertips to inadvertent cuts, and is also slow, due to the hand having to be re-positioned every few inches of cut. Further this method often does not lend itself to accurate cutting. Minerals wools, which are becoming increasingly popular, will not easily fluff to fill gaps making accurate cutting even more imperative.

Some insulation installers have been known to use tee squares that are very commonly used by drywall installers. However, tee squares have disadvantages for use in cutting batt insulation. The tee head interferes with starting the long knife blade required for the deep cuts, and a typical 48 inch rule edge is too long and therefore unwieldy even for the longest, most common crosscut, on 23 inch wide batts. Trying to compress the batt fibers by pressing down on a long flat, slender rule that will flex, has the same problem as does compression by hand alone, in that the hand must be moved frequently, to provide compression at the point of cutting. The rule blade of the tee square will pivot under the hand that is pressing it down, due to eccentric pressure from the knife blade, so it is hard to keep the cut square and on-line. Finally, using the tee square requires the user to curl their hand under the tool, to place and orient it, then withdraw the grasping fingers from underneath, and shift to downward force on the rule.

Some insulation installers use so-called speed squares to cut insulation. These are typically diecast aluminum 45-degree right triangles, with one dropped edge, to quickly align with rigid materials, and include angle and length markings. The advantages offered by speed squares in carpentry include speed, simplicity, and easy portability; however, as a cutting guide for batt insulation, the speed square is too small for even the narrower nominal 16 inch wide batts. When using it as a tool for compression, the wide triangular surface means that it wants to compress eccentrically, and compression may be insufficient at the edge chosen to guide the knife. As with the tee square, grasping and placing the tool on soft insulation requires a finger grip on the bottom surface, which must be changed to a down force on the top surface only, once positioned.

DETAILED DESCRIPTION

Overview

Figure 1:
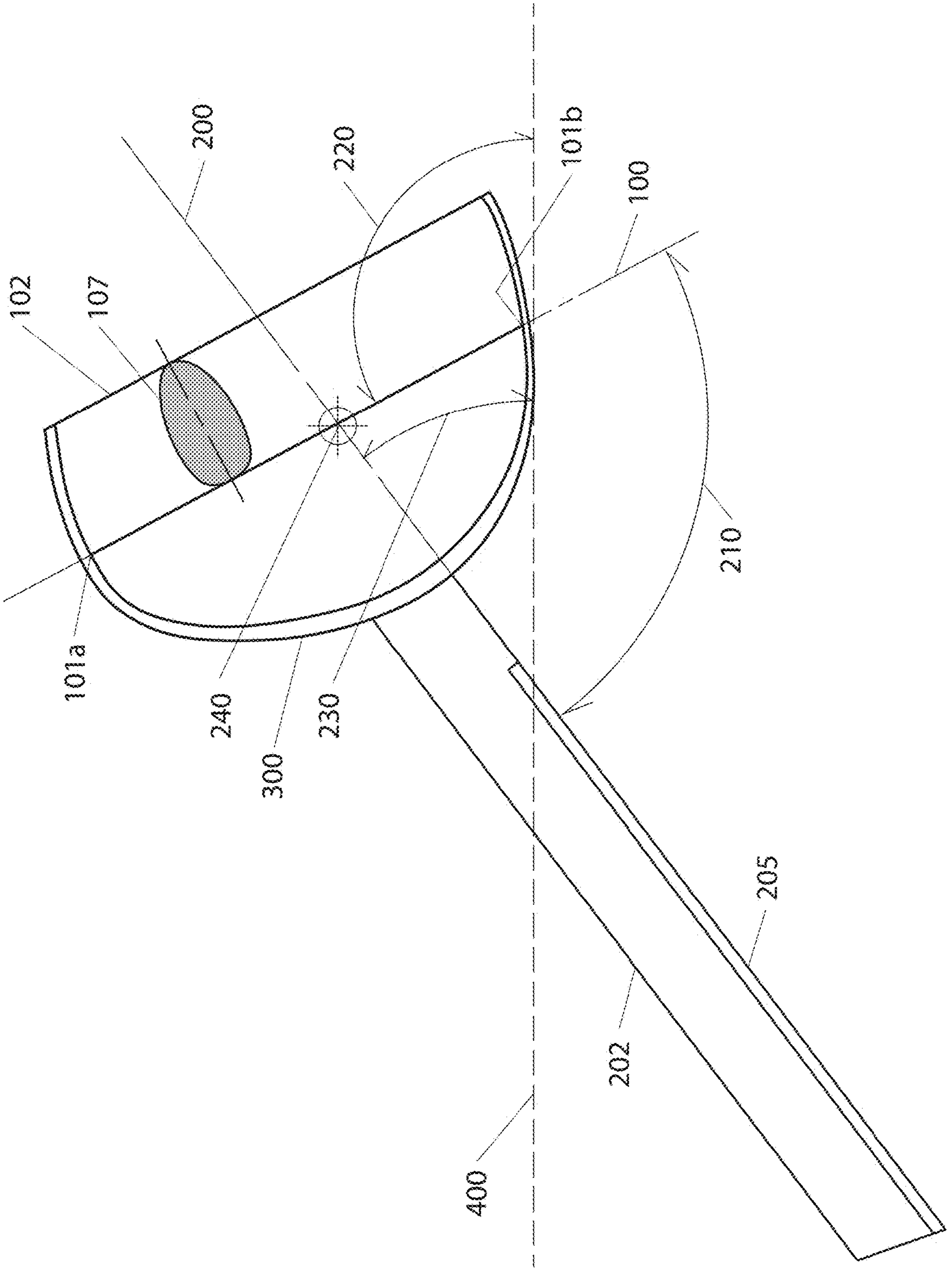
FIG. 1 illustrates a side view of a knife according to a first knife embodiment of the present invention.

Some embodiments of the invention comprise a knife for the cutting of fibrous batt insulation products, as well as rigid foam board insulation products. The knife has a handle and blade, each oriented so as to maximize the ability to pull the blade through the material to be cut, while minimizing the muscular effort and strain required of the user. Advantageously, in at least some embodiments, the overall effort required for cutting these types of materials is reduced as is the likelihood of insulation installers developing repetitive stress injuries.

The design of a typical insulation knife is complicated by the fact that a blade moving through a thick material generates a resistive force to the cutting action that will be centered in the often-considerable thickness of the material and parallel to the top and bottom surface of the material being cut. The result of this offset of the resistive force is that a blade pulled through the material by means of a handle above the material surface must include a moment force applied to the handle, to prevent rotation of the blade up and out of the cut.

Embodiments of the insulation knife are arranged to allow the line of the user's grip to be a little bit less than perpendicular with the knife edge permitting the user to make a cut stroke with less stress and strain incident on his/her wrist. The knife's grip is typically sized to allow all four fingers to be curled around the grip, so that some or all of the four fingers may be able to apply a pulling force, approximately in line with the long axis of the user's forearm. The knife's blade may repose at an angle to both the user's hand and the material to be cut, such that the blade projects down through the full thickness of the material, with minimal flexion of the wrist muscles. In use, the knife's configuration facilitates orientating the bade at an acute angle (230) to the surface of the material, so that there may be a shearing or slicing action of the blade edge in the material, rather than a splitting action, which may cause bunching and dragging of fibrous materials. The design also facilitates the placement of the fifth finger and the base of the palm as close to the material as possible. This cutting geometry facilitated by the knife's geometry limits the length of the effective lever arm of the blade in the material minimizing the moment force on the wrist also reducing user stress and strain.

Also described herein are embodiments of a cutting guide for use in cutting lofted fibrous insulation batting and other materials. The guide can be used with embodiments of the knife or with prior art knives. Most basically, the guide comprises a frame or base that is generally rectangular in shape with guide edges along the perimeter thereof against which the side of a knife blade can be aligned. A grip or grip rail is position above the frame typically offset towards and parallel with one of the longer guide edges. The handle is coupled with the frame by associated struts. The guide may also include ruled markings on its upper face proximate the guide edges to facilitate the measurement of cuts to be made. In at least one variation the long sides of the rectangle may be 15" or 23", to correspond respectively to the actual width of batts produced to fit 16" and 24" on center framing.

Some of the advantages offered by at least some of the embodiments of the guide include: the ability to self square to a batt; the ability to be moved by a user without having to change or alter his/her hand position; having a unobstructed knife path along an edge; a built in measurement scale to facilitate accurate cuts; and the positioning of the user's hand away from the guide edge and consequently away from the cutting edge of a knife being used therewith. Further, the design allows for use with either hand to serve both right and left handed installers.

Other embodiment(s) of the cutting guide may be a long linear cutting guide in the form of a straightedge rule. This may allow for more efficient cutting of longer dimensions, such as lengthwise cuts on batts or sheet materials. Most basically, these embodiments of the long straightedge rule cutting guide comprise a long, narrow straightedge body with the two long edges folded orthogonally downward to stiffen the body substantially over what would be experienced with a prior art flat rule of similar thickness, materials and weight. The straightedge rule cutting guide body is generally rectangular in shape with at least one long side comprising a guide edge against which the side of a knife blade can be aligned as it is drawn through the material to be cut. A grip or grip rail is positioned above the straightedge body, typically offset away from and parallel to a primary guide (or cutting) edge. The grip rail is coupled with the straightedge body by elevated blocks. The cutting guide may also include ruled markings on its upper face proximate the primary guide edge, to facilitate the measurement of cuts to be made. In at least one variation, the length of the long side of the cutting guide may be about 48 inches to correspond to the 48-inch length of industry standard batts. In at least one additional variation the length of the long side of the cutting guide may be about 96 inches to correspond to the 96-inch length of other industry standard batts.

Some of the advantages offered by at least some of the embodiments of the straightedge rule cutting guide include: the ability to maximally compress the batt material at the cut line; the ability to compress the material uniformly along the full length of the guide by virtue of the minimization of upward deflection of the guide; the resistance to rotating off the cut line while drawing the knife past the edge; the ability to be moved by a user without having to change or alter his/her hand position; having an unobstructed knife path along the guide edge; a built in measurement scale to facilitate accurate cuts; and the positioning of the user's hand away from the guide edge and consequently away from the blade edge of a knife being used therewith. Further, the design allows for use with either hand to serve both right- and left-handed installers.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The phrases "knife edge" and "blade edge" are used interchangeably herein and refer to the typically elongated sharpened edge of the knife blade.

The phrase "blade line" refers to a substantially straight line (200) extending along the blade edge and projecting forwardly and rearwardly therefrom. It can also be referred to as the "blade edge line".

Figure 5:
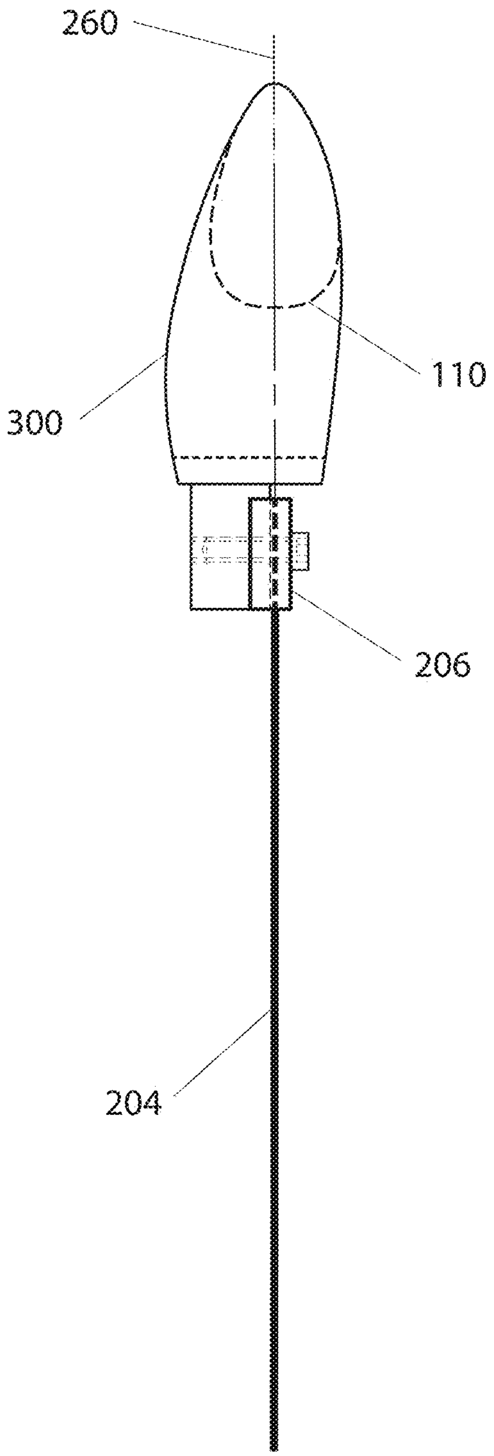
FIG. 5 illustrates a top view of a knife according to the fourth knife embodiment of the present invention
Figure 6:
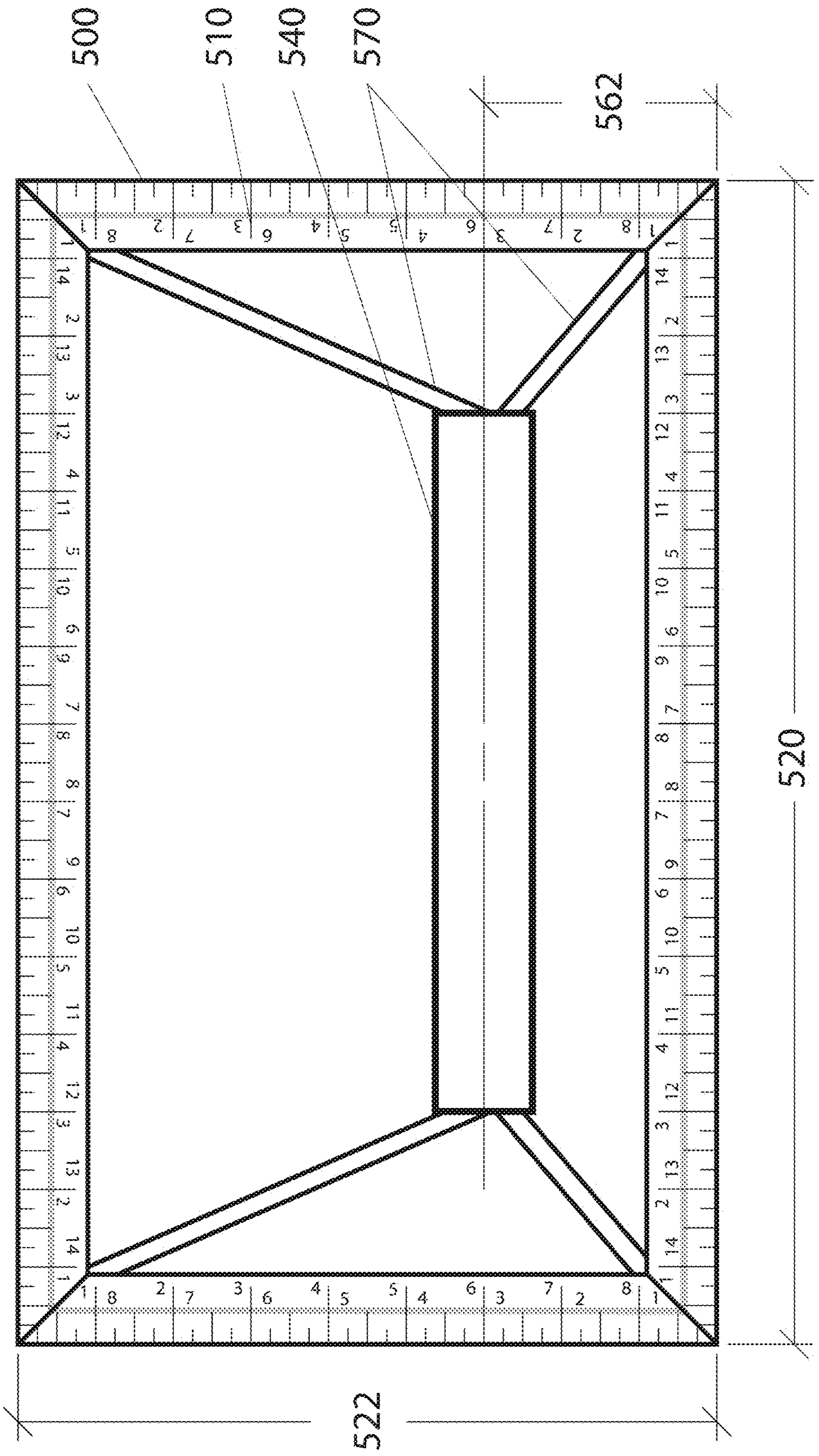
FIG. 6 illustrates a top view of a cutting guide according to an embodiment of the present invention.
Figure 7:
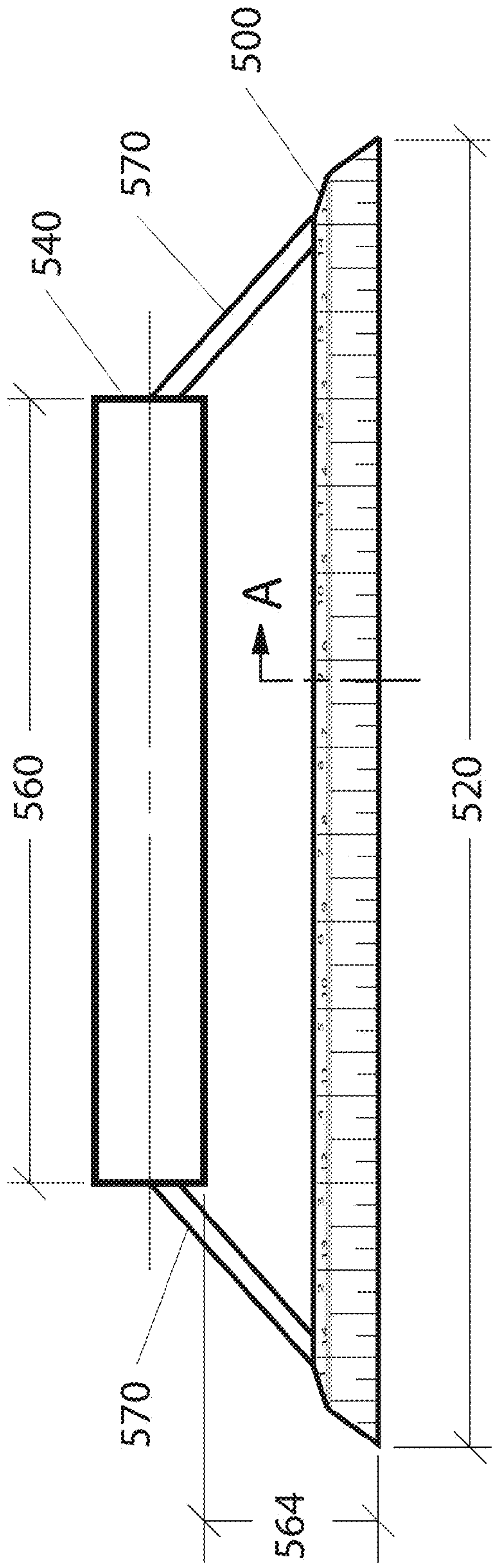
FIG. 7 illustrates a front side view of a cutting guide according to an embodiment of the present invention.
Figure 8:
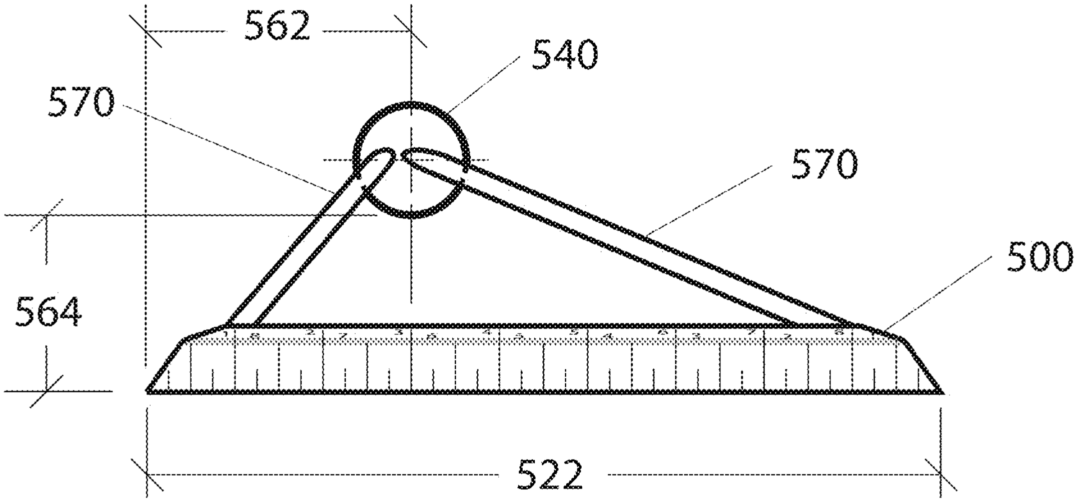
FIG. 8 illustrates a right side view of a cutting guide according to an embodiment of the present invention.

The phrase "blade plane" refers to a plane fully containing the blade line that extends upwardly through the midpoint of the knife blade's thickness as shown as a line (260) in FIG. 5.

The phrase "grip line" shall mean a line (100) defined by first and second points (101*a&b*) located in the blade plane. The first point (101*a*) is located on the grip's leading edge within the blade plane at a location furthest from the blade edge in the top half (above the grip intersection point 240). The second point (101*b*) is located on the grip's leading edge within the blade plane at a location furthest from the blade edge in the bottom half (above the grip intersection point 240).

The phrase "grip intersection point" refers to a point (240) of intersection between the blade line and the grip line.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The phrase "straightedge body" refers to the generally inverted U-shaped element that comprises the totality of the straightedge rule cutting guide, exclusive of any attachments for a grip rail.

The phrase "grip rail" refers to the linear element mounted above the straightedge body, which allows the user's hand to both grasp and the fingers curl under the grip rail, and which transfers the downward hand pressure into the straightedge body. The grip rail may include a cushioning element such as a foam or cushioning gel layer on its outside surface.

The phrase "elevating block" or "elevating blocks" as used herein refers to any structure of any suitable material that is attached or coupled to both the straightedge body and the grip rail to elevate the grip rail a desired distance above a top surface of the straightedge body.

An Embodiments of a Knife

Several embodiments of a knife are described herein with reference to FIGS. 1-5. The embodiments all share several basic components including a knife blade (202, 204) with a blade edge (205), a grip (102, 110) and a guard (300, 302, 304) disposed between and providing for the functional coupling of the blade and the grip.

The embodiments share a similar geometry specifically concerning the grip relative to blade edge. In particular, the angle (210) formed between a projection line coincident (200) with the blade edge (205), referred herein as the blade line, and the grip line (100) of the grip is preferably between 70 and 90 degrees, more preferably between 75 and 85 degrees and most preferably 80 degrees. Further, the intersection (240) of the blade line and the grip line is located at or slightly below a longitude mid-point of the grip line. The foregoing geometry naturally tends to create a circumstance wherein a user cutting relatively thick batting or foam holds the knife at an angle (210) of about 35 degrees between the blade edge and the horizontal top surface of an item being cut as is illustrated by a dashed line (400) in the Figures. When in this orientation, the grip (102) may lean away from the user, beyond perpendicular to the material surface (400), at an angle (220) that may be approximately 115 degrees.

A first embodiment of a knife incorporating one or more of the design parameters described above is illustrated in FIG. 1 with the knife orientated as it would be when cutting through a horizontally disposed piece of material. The knife comprises a generally semicircular or u-shaped guard (300) that has a grip (102) that extends between the open-end portions of the guard, and the blade (202) is attached, typically through welding or mechanical means, to the guard proximate the center of the guard's arc.

The blade (202) as shown may be straight and have a downwardly facing single blade edge (205) that extends from a distal end of the blade to a terminus a predetermined distance from the blade's attachment to the guard (300) at its proximal end. The blade is usually made of steel of the appropriate strength and hardness for the materials it is intended to cut. The length of the blade can vary dramatically depending on the specific intended use but typically ranges from about 3 to 10 inches. Further, while a substantially straight blade is illustrated, variations wherein a portion of the blade, such as a distal end portion, is curved are contemplated.

As indicated above the guard (300) may be semi-circular or u-shaped and of sufficient size to permit the fingers of a user to fit between it and the grip (102) when the knife is being held. The grip can be made of any suitable material such as steel, aluminum alloy, other metals, and reinforced plastics. In at least one variation the guard comprises steel and is about 0.060" thick with a side to side width approximating the width of the grip at about 0.5" to 0.75". Besides providing a means for joining the blade and the grip, the guard effectively hinders the chance that a user's hand slide into the blade if the user's grip on the grip unintentionally releases.

The grip (102) can be comprised of any suitable material and comprise any suitable cross-sectional shape that will permit a user to comfortably hold the knife while using it to cut material. The longitudinal length of the grip is 3.5" to 4.5" permitting a user the ability to comfortable wrap all four of his/her fingers therearound. As shown in FIG. 1, the grip is a generally ovular slightly tear-shaped cross section (107). A typical grip may be made of plastic with or without a metal core, and may also be covered in a resilient cushioning material. The grip may be attached to the ends of the guard in any suitable manner including adhesive bonding and/or mechanical attachment.

Figure 2:
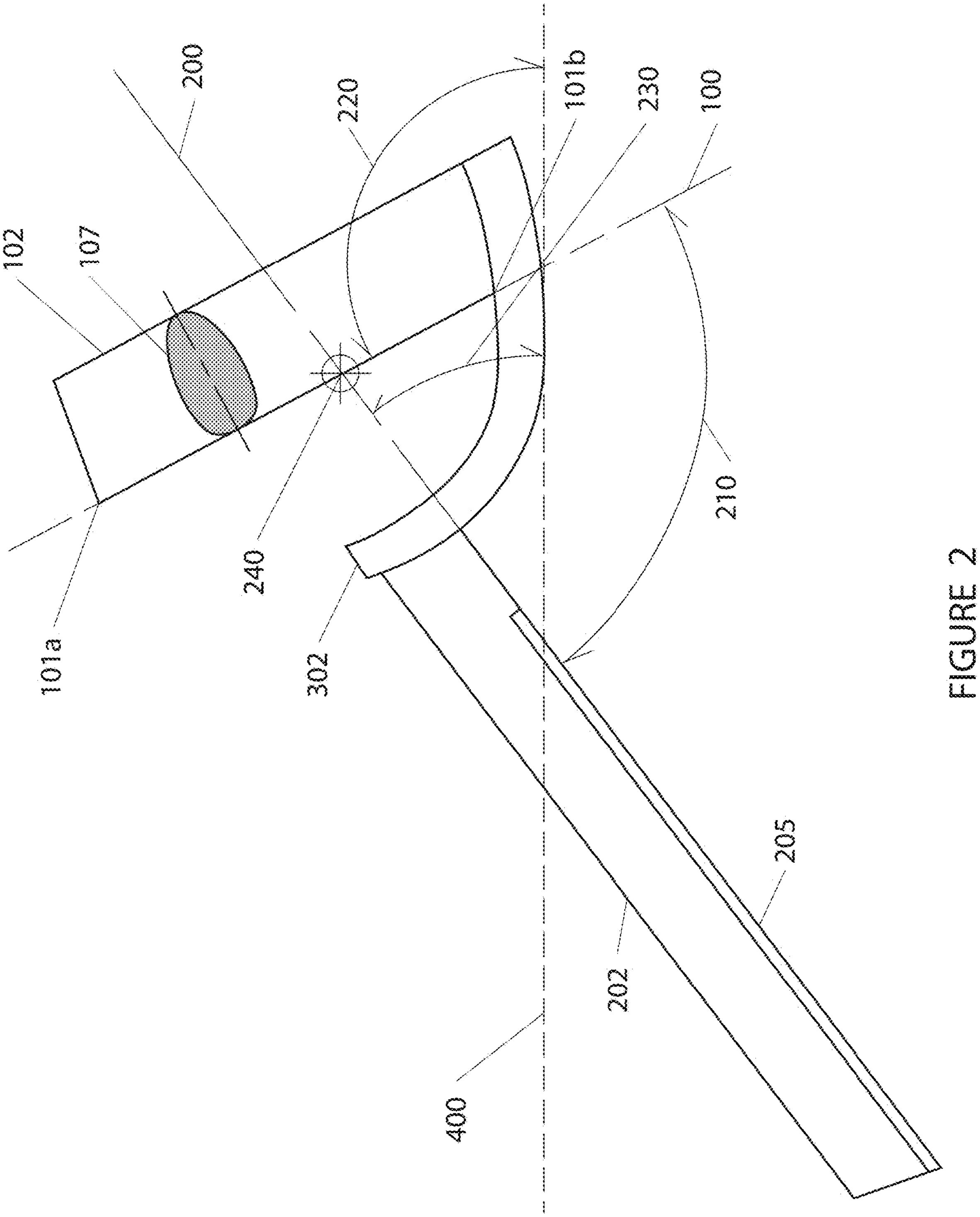
FIG. 2 illustrates a side view of a knife according to a second knife embodiment of the present invention.

A second embodiment of the knife is shown in FIG. 2 and is primarily distinguished from the first embodiment in the configuration of the guard (302). In this variation, the guard does not form a complete arc around the finger area forward of the grip (102), but rather may approximate a quarter circle. The guard (302) may emanate from only the bottom of the grip (102), and thereby connect the required blade (202) geometry to the grip (102) geometry, while leaving the top of the grip (102) unguarded and open. The guard is typically thicker than the guard on the first embodiment to provide the desired stiffness.

Figure 3:
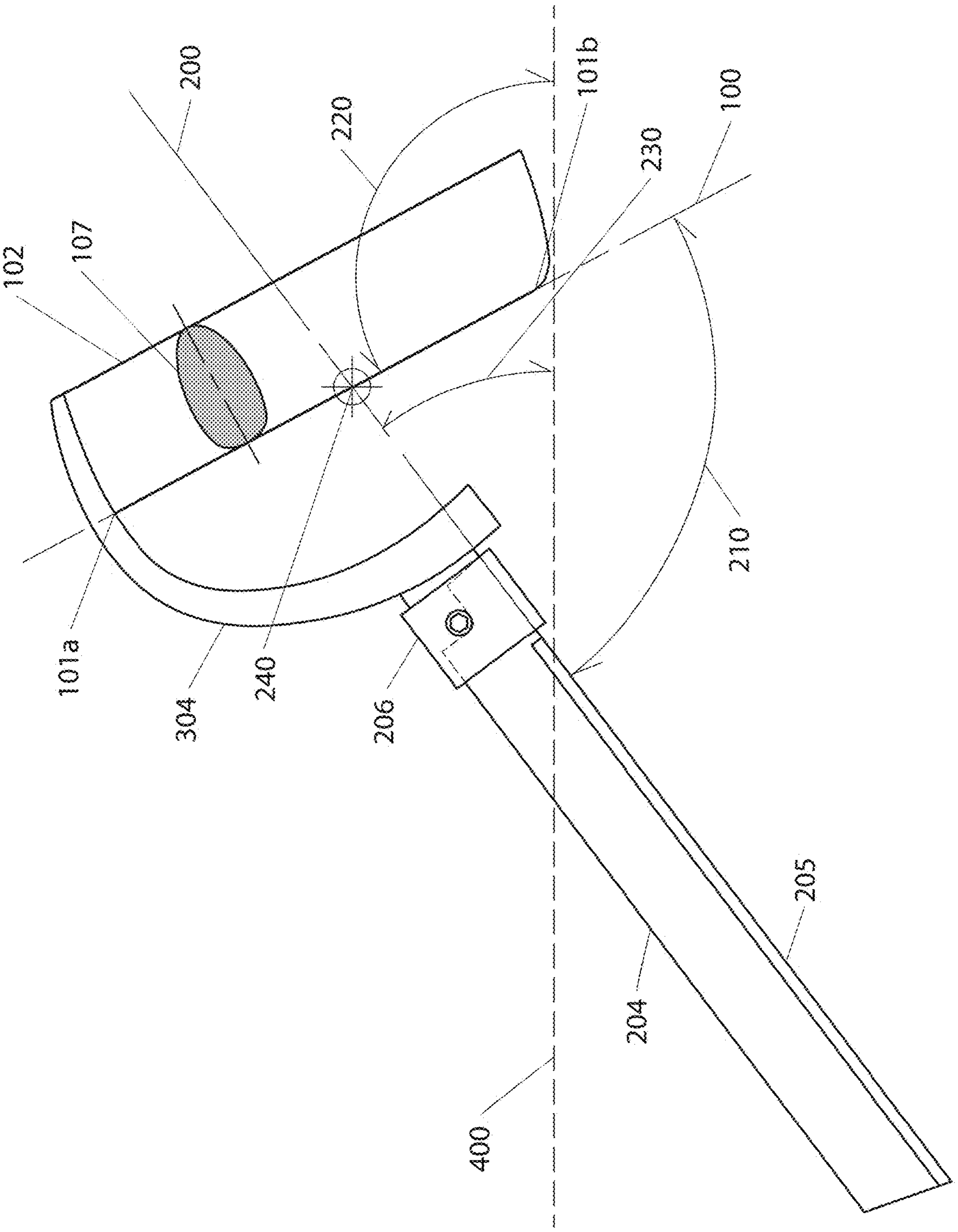
FIG. 3 illustrates a side view of a knife according to a third knife embodiment of the present invention.

A third embodiment of the knife is shown in FIG. 3 and is distinguished over the second embodiment in the orientation of the guard (304) and the use of a blade clamp (206) to secure a removable and replaceable blade (204). As shown the guard is generally similar to the guard of the second embodiment except it extends upwardly from the blade mounting location instead of downwardly. The third embodiment also includes a blade clamp that is attached to the front side of the guard. The clamp can be of any suitable design as are well known in the art, and can be configured to receive and secure blades of different lengths and configurations having a compatible mounting tang. In one example, the blade clamp comprises a mechanism similar to those used in reciprocating saws. This embodiment permits a user to replace a blade that has become dull or damaged with a new blade. Further, the blade clamp allows a user to select a blade of a desired length for a particular job, or choose a blade with a particular blade edge, such as one that is serrated.

Figure 4:
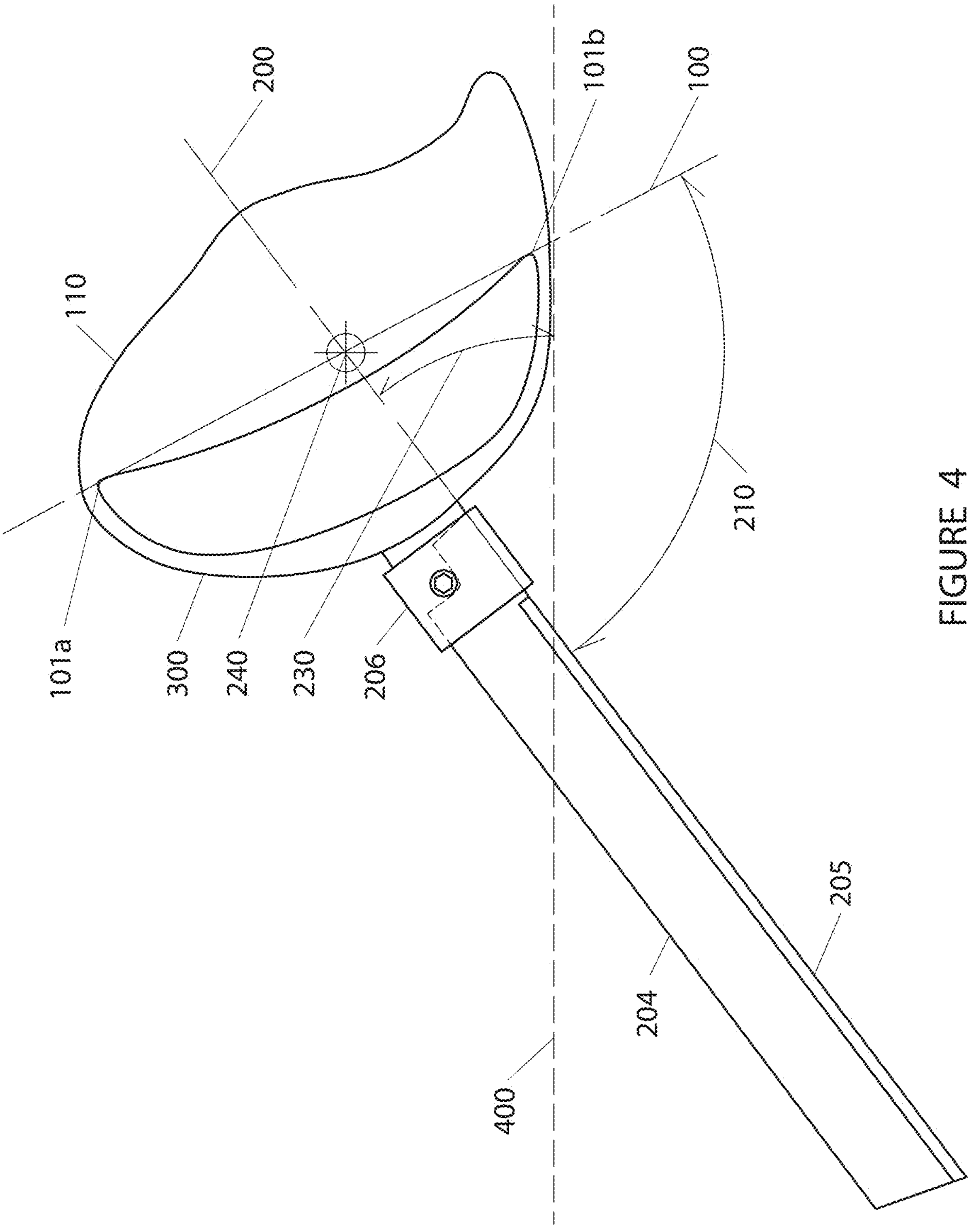
FIG. 4 illustrates a side view of a knife according to a fourth knife embodiment of the present invention.

A fourth embodiment of the knife is shown in FIGS. 4 and 5 and is distinguished over the first embodiment by having a blade clamp (206) similar to the one described with reference to the third embodiment permitting the use of a replaceable blade (204), and utilizing a ergonomically-shaped grip (110) The grip (110) may have contoured leading and trailing faces, to better conform to the profile shape of the human hand while gripping the knife. This may serve to more evenly distribute the pressure from the pulling force to all fingers curled around the grip.

FIG. 5 is a top view illustration of the fourth embodiment. Of important note is how the blade clamp 206 when centered on the front surface of the guard 300 causes the knife blade 204 to be offset to one side; the left in the illustrated example. To ensure the grip 110 is centered left to right relative to the knife blade and the blade plane, the guard curves to the left. The amount of left to right adjustment of the guard to ensure the alignment of the grip and the knife blade will vary depending on the type, design and configuration of the blade clamp.

The grip, the guard, and the blade clamp mechanism may a fabricated assembly of various component parts. The component parts may be metal, plastics or composites depending on the material or combination of materials best suited for a particular design or configuration. A combination of the grip and guard may also be die cast in metal with a clamp mechanism fastened thereto by welding, brazing, adhesive joining or mechanical fastening. The combination may also be injection molded in reinforced or unreinforced polymeric material, and may have a boss for the blade clamp molded therein. Any embodiment of the grip may have a non-slip or cushioned grip surface material applied or over-molded on the body of the grip.

First Embodiments of a Cutting Guide

The guide is generally comprised of a rectangular body in the form of an open rectangular frame, (500) that incorporates a grip rail assembly that has grip rail (540) located above the surface of the frame (500). The grip rail is oriented substantially parallel to the left and right longitudinal sides of the rectangular frame/body. The grip rail (540) may be disposed over the entire length of the frame (500), or may be truncated in length (560) relative to the frame, with an arrangement of elevating spacers shown herein in the form of struts (570), connecting the grip rail (540) to the frame (500). The grip rail (540) may be disposed centered on the narrow dimension of the frame, or may be offset (562) closer to one longitudinal sides of the frame compared to the other longitudinal side, such that downward pressure on the grip rail will apply a greater pressure to the nearer longitudinal side, proportional to the relative location of the grip rail (540) across the width of the frame (500). In use, the frame (500) may be oriented squarely across the batt, and then pressed downward to compress the fibers of the batt. A knife blade may then be drawn along the selected side of the frame yielding a straight cut.

Figure 9:
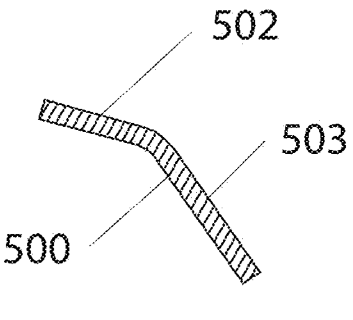
FIG. 9 illustrates a cross sectional view of the frame taken at line A of FIG. 7 according to an embodiment of the present invention.

The frame (500) may be of metal, and have a cross section of a folded plane comprised of a top side and longitudinal and lateral sides that extend downwardly from the top side at an angle of 30 degrees or more. This configuration may provide greater longitudinal stiffness to the frame and the bottom edges of the various sides and thus compress the batts more evenly over the length of the bottom edges. As shown in FIG. 9, the lower plane portion or sides (503) of the frame (500) may angle down, so that the narrow bottom of the guide edge first contacts the batt, and applies enhanced compression to the batt directly there below. The upper plane portion or top side (502) of the folded frame (500) may be generally horizontally-orientated, to provide a more easily readable surface for rule markings (510) inscribed, printed or otherwise formed thereon.

The frame (500) may have a length or longitudinal dimension (520) of 15 inches or 23 inches, nominally corresponding to the widths of standard batt insulation products. The width or lateral dimension (522) may be 9 inches or 11 inches, nominally corresponding to the depths of standard framing materials, thus facilitating measuring and cutting the insulation pieces to fill joist or rafter bay ends. Inch and fractional rule marking (510) may be stamped or molded in and or printed on the top side proximate the intersection with the various longitudinal and lateral sides. The scale (510) may be delineated in integral inches, the numerals being stamped, molded or otherwise applied in any manner to the frame. The inch scales (510) may be doubly enumerated in two directions, starting from each end of a given side intersection. The sizing of the frame (500) and the markings (510) thereon may also be per metric standards of sizing, and delineated per metric units of measure.

As previously mentioned, the grip rail (540) may be displaced (564) elevated above the frame (500). This allows the frame (500) to compress the batt at the bottom edges of the longitudinal and lateral sides, without unnecessary compression of the batt within the open interior of the frame, or from the user's hand curled under the grip rail (540). The grip rail (540) may be of any suitable cross section from round to ovular. The grip rail may also have an ergonomic cross section and/or a configuration that facilitates the application of a torque or twisting motion to the frame by wrist action. Further, the cross section may be made broader or otherwise sufficiently sized or shaped as to allow for downward pressure from the user's palm, while limiting the strain on the hand. The grip rail may be of solid material or hollow element. The grip rail may also have a cushioning element overlaying a structural core.

The length of grip rail (540) may be less than the length (520) of the frame. The grip rail (540) may be connected to the frame by elevating spacers such as four struts (570) or other slender structural spacing elements. These struts (570) may each run from two adjacent corners of the lateral side of the frame (500) to one end of the grip rail (540), and be repeated at the two corners of the opposite lateral side of the frame (540) to the opposite end of the grip rail (540). This arrangement may induce a tensile force into the frame (500), when pushing downwardly into a batt. This serves to minimize bending in the frame (500), allowing for minimal sizing of the frame (500) and struts (570). In a variation, the struts (570) may take the form of a molded surface that connects two corners of the width (522) of the frame to the corresponding end of the grip rail (540).

Figure 10:
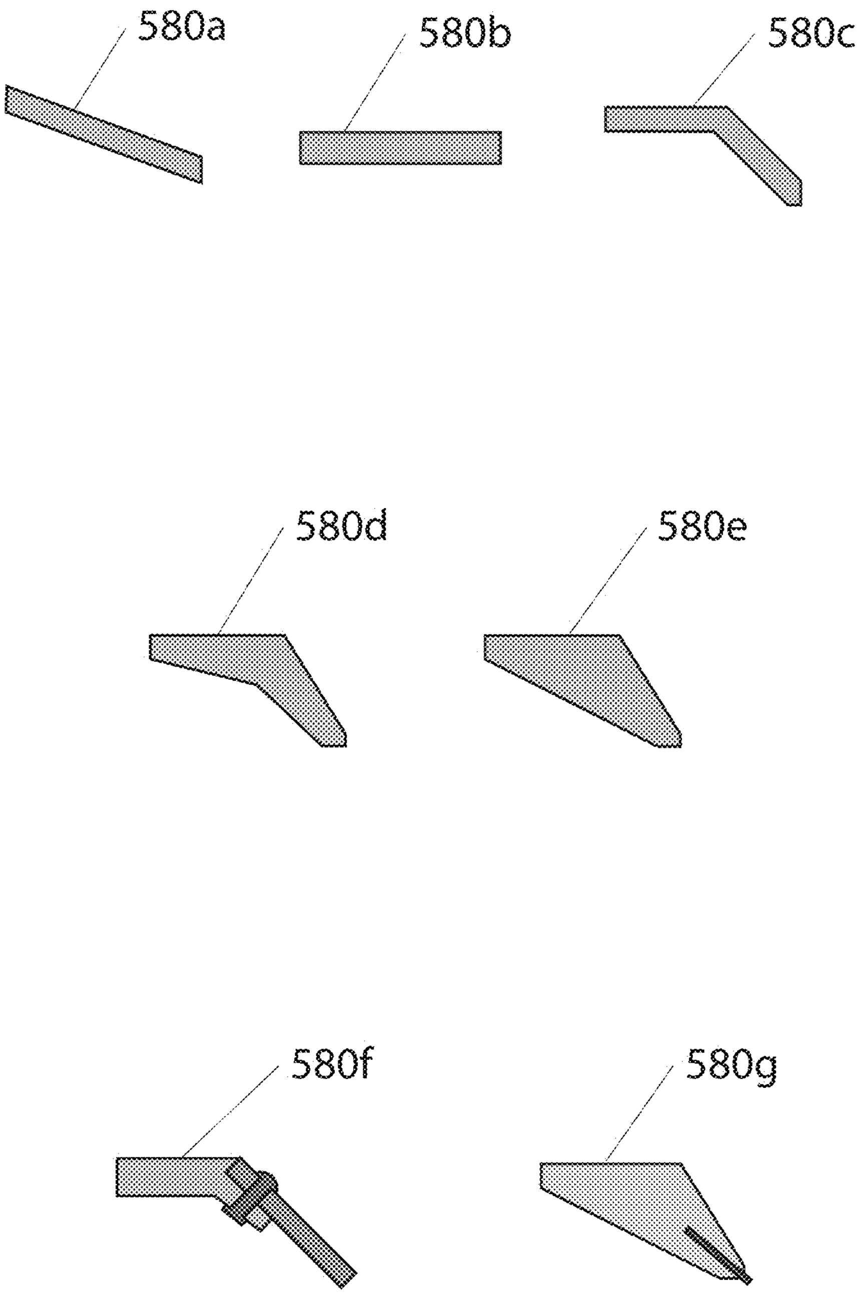
FIG. 10 illustrates cross sectional variations of the frame including the guide edge according to embodiments of the present invention.
Figure 11:
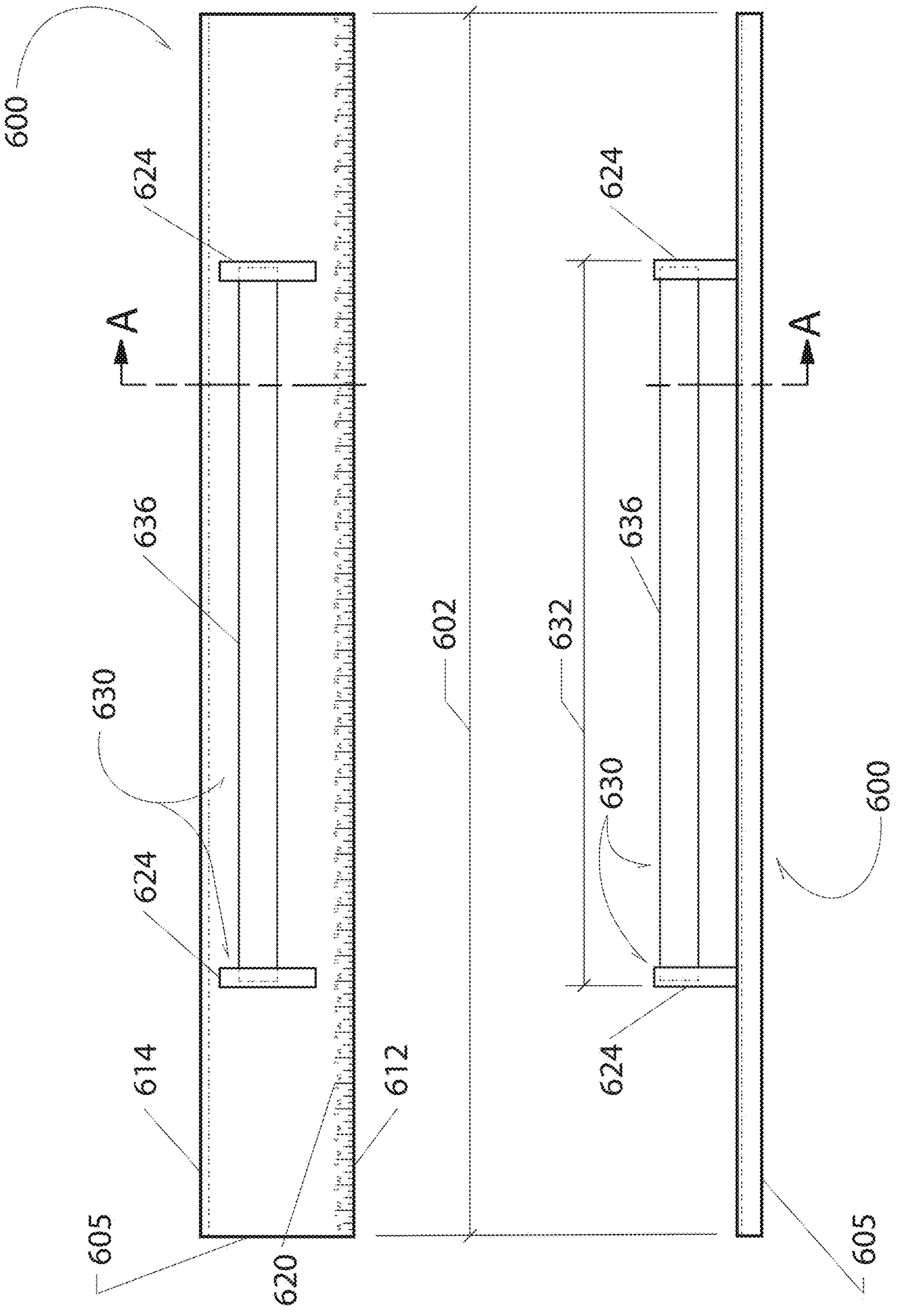
FIG. 11 illustrates top and side views of a straightedge rule cutting guide according to an embodiment of the present invention.

The frame (500) may be composed of discrete parts that are assembled during manufacture. These parts may be extruded and cut to size, or molded in any material, or any combination thereof. The means of assembly may include rivets, welding, adhesives, glues or resins, or any combination thereof. The frame (500) itself may be composed of thin flat or folded elements (580*a-c*) in various configurations as shown in FIG. 10. The frame itself may also be composed of extruded or molded elements (580*d-e*) of a suitable cross section. Individual frame rails may be directly attached to the strut (570) ends at each corner of the complete rail and strut assembly.

The frame (500), or the entire device, may be molded as a single piece. This may take the form of a die-casting in a suitable metal, or as an injection molded plastic or polymer piece. A plastic or polymer injection molded device may include one or more metal edges molded into the frame as also shown in the cross section (580*g*) in FIG. 10, to provide a durable, cut resistant guide edge for an insulation knife. A plastic or polymer injection molded device may also include one or more metal edges (580*f*) mechanically attached to molded frame rails.

Second Embodiments of a Cutting Guide

Two variations of an embodiment of a straightedge rule cutting guide (600) are illustrated in FIGS. 11-16, and may be generally comprised of a rectangular body in the form of a u-shaped straightedge body (605) having a top side that intersects with folded-down left and right longitudinal sides (612, 614) that extend along the entire length of the body, thus forming the aforementioned generally-inverted u-shape in section. The straightedge rule cutting guide further includes a grip rail assembly (630) comprising a grip rail (636, 638) and at least first and second elevating spacers in the form of elevating blocks (624). The length of the grip rail is oriented substantially parallel to the left and right longitudinal sides of the straightedge body (605) and attached to the straightedge typically at the straightedge top side. The length (632, 633) of the grip rail assembly (630) typically bounded by the first and second elevating blocks may be a fraction of the straight edge length (602, 603) of the straightedge body with the arrangement of elevating blocks (624) connecting the grip rail (636, 638) to the straightedge body. The grip rail (636, 638) may not be centered above a longitudinal centerline of the straightedge body (605) but be disposed laterally (646) so as to allow the knife and the one hand grasping it to pass by uninterrupted by the other hand on the grip rail while a user is making a cut.

The straightedge body (605) may be of metal, or may be a molded composite. The straightedge body may be an extruded cross section for maximum strength, rigidity and simplicity of manufacture. The right and left longitudinal sides (612, 614) serve to increase the physical depth (606) of the straightedge body and preferably have a depth (or width) of at least about 0.50". This configuration substantially stiffens the straight edge body over a planar body increasing its resistance to vertical deflection, while also reducing the surface area that fully compresses the batt material (i.e. only the area of the batt directly underneath the longitudinal bottom edge of the cutting edge side, referred to herein as the right side (612), is maximally compressed). The bottom edge of the right longitudinal side may also comprise a bevel (610) as shown in FIGS. 12-15 that extends upwardly and to the inside. The bevel acts to create a sharper edge providing a better bite on batt materials as well as on foam board products.

Figure 12:
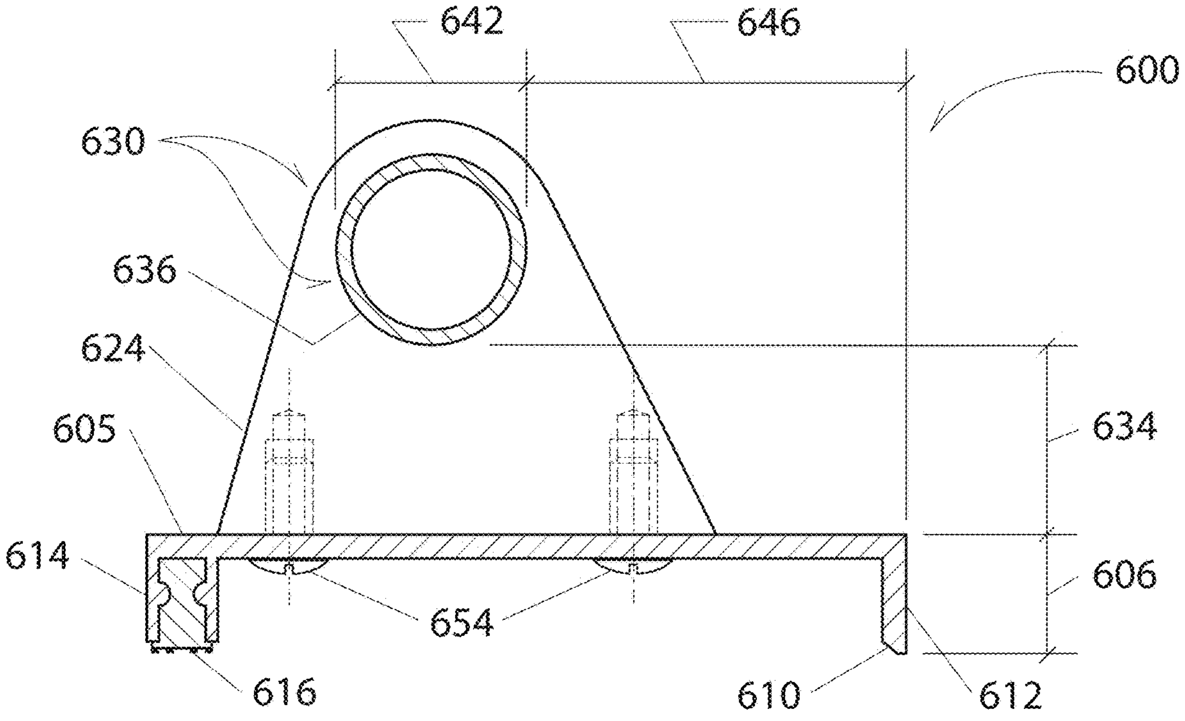
FIG. 12 illustrates a cross-sectional view of the straightedge rule cutting guide taken at line A of FIG. 11 or FIG. 16 according to an embodiment of the present invention.
Figure 13:
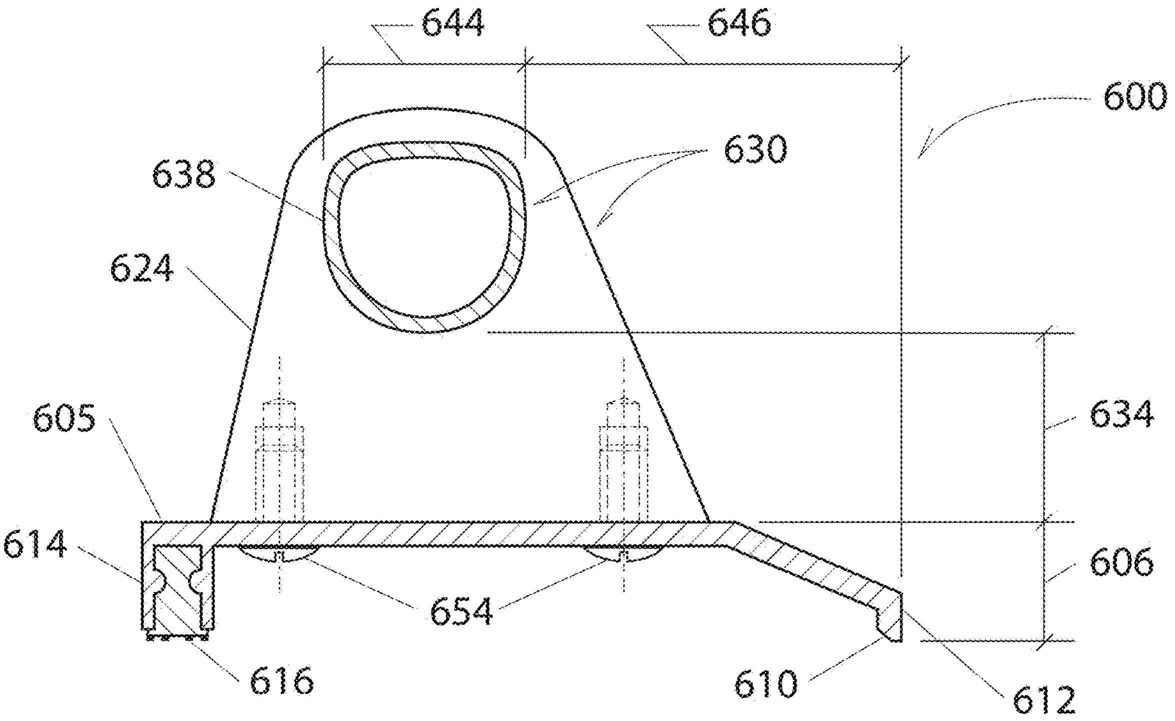
FIG. 13 illustrates a cross-sectional view of a straightedge rule cutting guide taken at line A of FIG. 11 or FIG. 16 according to another embodiment of the present invention.
Figure 14:
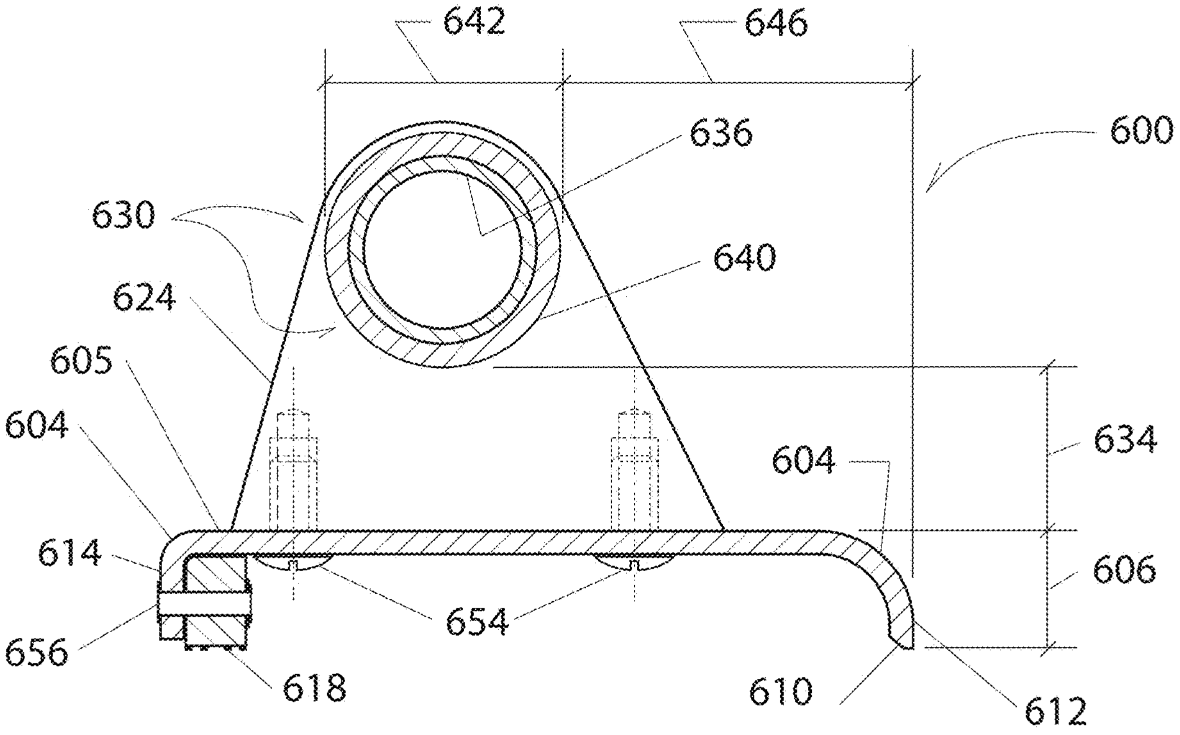
FIG. 14 illustrates a cross-sectional view of a straightedge rule cutting guide taken at line A of FIG. 11 or FIG. 16 according to yet another embodiment of the present invention.
Figure 15:
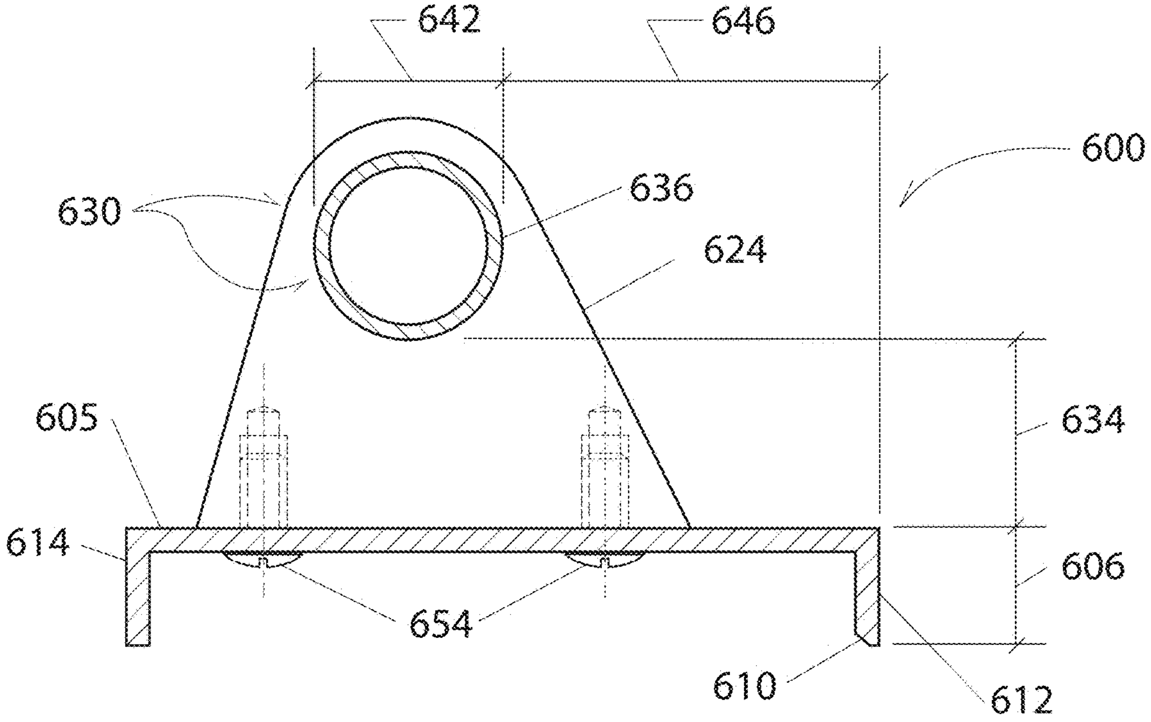
FIG. 15 illustrates a cross-sectional view of a straightedge rule cutting guide taken at line A of FIG. 11 or FIG. 16 according to an additional embodiment of the present invention.
Figure 16:
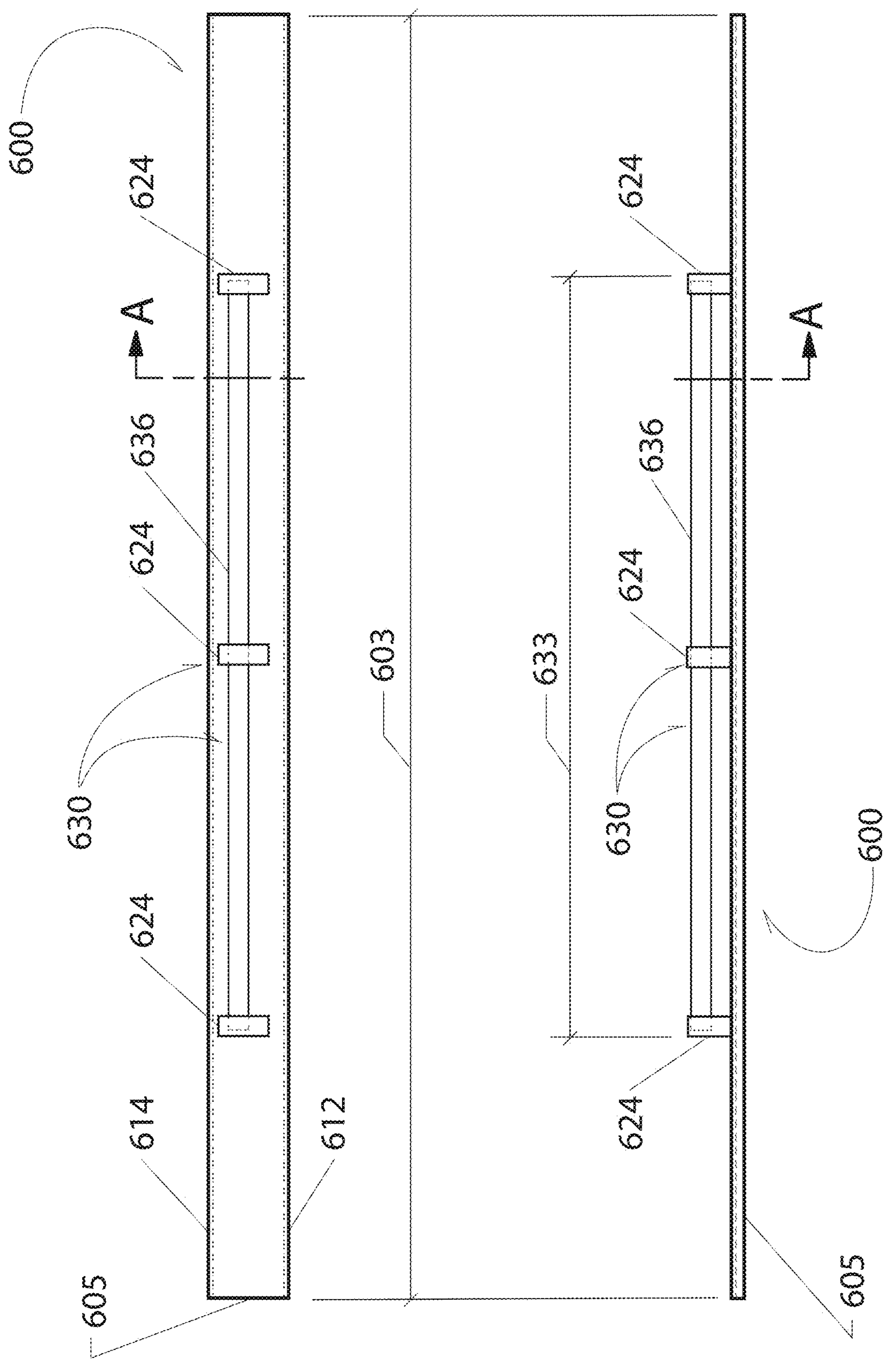
FIG. 16 illustrates top and side views of a longer straightedge rule cutting guide (about 96") according to an additional embodiment of the present invention.

As can be seen in the cross-sections of FIGS. 12-15, several variations of the straightedge body (605) are contemplated. In FIG. 12, the intersections between the generally horizontal and planar straightedge top side and the folded down left and right longitudinal sides (612, 614) are sharp; whereas, the intersections (604) in the FIG. 14 embodiment are radiused. FIGS. 12-14 show the left sides (614) as including non-skid inserts/attachments (616 & 618); whereas, the left side of FIG. 15 does not incorporate an insert. Finally, the straightedge top side proximate the right longitudinal side (612) of FIG. 13 is canted downwardly. As can be appreciated, other configurations are also possible as would be obvious to one of ordinary skill in the art given the benefit of this disclosure.

As mentioned above, the left longitudinal side (614), which can also be described as the gripping side, may incorporate a non-skid insert (616) or attachment (618) made of rubber or another suitable elastomeric material along or proximate its bottom. The insert/attachment may minimize sliding or rotation of the guide while being used for cutting rigid foam boards or other similar materials. A scale or rule (620) comprising inch and fractional marks including numeral markings may be stamped or molded in, printed on and/or inserted along the straightedge top side of the straightedge body (605) proximate one or both left and right longitudinal sides (614, 612). In some variations, the scale (620) may be doubly enumerated in two directions, starting from each end of the body. The scale (620) thereon may also or alternatively be delineated to the metric standard.

As previously mentioned, the grip rail assembly (630) may be displaced on top of and above the top surface of the straightedge body (605). The grip rail (636,638) may be spaced far enough above the top surface of the straightedge body for a spacing distance (634) to permit a user's fingers to be placed under the grip rail, thus allowing the cutting guide (600) to be picked up and moved without the necessity of re-orienting the user's hand. Typically, the spacing distance between the top surface of the straightedge body and the bottom of the grip rail (636, 638) is at least three quarters of an inch and more preferably at least one inch.

The grip rail (636, 638) may be of any suitable cross section, such as generally round as indicated for the grip rail (636) of FIG. 12 or generally ovular as indicated for the grip rail (638) of FIG. 13. The cross section of the grip rail may be made broader or otherwise sufficiently sized or shaped as to allow for downward pressure from the user's palm, while limiting the strain on the hand. Typically, the grip rail has a diameter (642) or diameter equivalent (644) of about 1 to 2 inches. The grip rail may be of solid material or a hollow element. The grip rail (636) may also have a cushioning element or wrap (640) substantially covering its surface as shown in FIG. 14. The cushioning element typically comprises a resilient foam or gel material, such as, but not limited to, neoprene foam.

The grip rail (636, 638) may be centered laterally relative to the straightedge body (605); however, because the straightedge body can be relatively narrow (typically about 3.5-5 inches wide), the grip rail may be offset away from the right side (612), in order to provide clearance (646) allowing the hand gripping the knife during a cutting operation to pass by the other hand that is gripping the grip rail. Typically, the required clearance is at least about 1.75 inches.

The length (632, 633) of the grip rail assembly (630) may be less than the length (602, 603) of the straightedge body (605) with the grip rail assembly generally centered lengthwise on and attached to the straightedge body. The grip rail assembly typically comprises a grip rail (636, 638) attached to the straightedge body by elevating blocks (624) or other elevating spacers. In the preferred embodiment, the length of the grip rail (632) may be about 60 percent of the length (602, 603) of the straightedge body to provide additional stiffening of the straightedge body to minimize the maximum vertical deflection of the straightedge body and entire cutting guide (600) when compressing a uniform material over the full length thereof. In a longer embodiment of this straightedge rule cutting guide illustrated in FIG. 16, there may be one or more intermediate elevating blocks (624) arranged along the length of the grip rail (636, 638). The combination of the grip rail and elevating blocks may effectively increase the depth of the total assembly, thus further increasing the cutting guide's stiffness and resistance to vertical deflection.

The straightedge rule cutting guide (600) may be composed of discrete parts that are assembled during manufacture. These parts may be extruded and cut to size, fabricated from or molded in any material, or any combination thereof. The means of assembly may include rivets (656), screws (654), welding, adhesives, glues or resins, or any combination thereof. In the preferred embodiment, the straightedge body (605) may be composed of an extruded or molded element of a suitable cross section. The rubber, elastomeric material, or other non-skid edge insert (616) may be molded in place on the straightedge body (605), or may be inserted separately and then optionally bonded in place. In another variation, the rubber, elastomeric material, or other non-skid edge element (618) may be mechanically attached by rivets (656) or similar fasteners.

As can be appreciated, use of the straightedge rule cutting guide (600) is not limited to use in cutting fibrous batts, but rather can be used as a layout, marking and knife cutting guide for any flat materials. The elevated handle facilitates moving the guide around a piece of flat material quickly and easily, offering advantages over traditional rulers and squares. The non-skid edge on the left longitudinal side helps reduce the chance of slipping or rotating off-line while making cuts on solid surface materials such as foam boards.

Methods of Using the Knife and Guide, Separately, and Together Applications of This Invention Embodiments of the knife are configured for use in cutting fibrous batt insulation, such as fiberglass and mineral wool. They can also be used to cut and trim foam board insulation, as well, as other sheet materials, such as cardboard. The knife can be used freehand or in conjunction with a straightedge or other suitable cutting guide, such as, but not limited to, embodiments of the cutting guide described herein.

FIGS. 1-4 show the knife in relation to a dashed line 400 that represents the ideal orientation of the knife relative to the top surface of the material being cut. As shown the grip line is angled forwardly relative to the line making about a 115 degree cutting angle with the line. Embodiments of the knife are configured so that at this angle the blade edge extends at least slightly above the line, and preferably, depending on the length of the blade, it extends completely through the thickness of the associated material. Given the dimensions of the knife embodiments, and in particular the angle between the blade edge and the grip line, as well as, the intersection of the blade edge line at or below the midpoint of the grip line, experimentation has demonstrated that installers using the knife naturally gravitate towards using it at or near the prescribed cutting angle.

Cutting is usually performed by way of a pulling motion at or near the specified cutting angle causing the material, especially fibrous materials, to relatively easily shear.

When cutting fibrous batt materials, it is advantageous to compress the batt proximate the desired cut line. This can be accomplished in a number of ways from compressing the batt with the user's other hand, a ruler or straightedge, a strip of lumber, or preferably an embodiment of the cutting guide described herein. Compressing the fibers greatly enhances the ease and precision at which the batts can be cut. Furthermore, when using an item to compress the fibers that has a straight edge or side, it can also be used to guide the cut.

To use embodiments of the cutting guide described herein, the user typically places the guide over the batt aligning the long edge closet to the grip rail with the desired location of the cut. Where the cut is to be perpendicular to the length or the width of the subject batt, the short edge of the guide can be used to align the guide to ensure an orthogonal cut. The ruled surfaces can be used to measure the cut as is desired.

The user then presses down on the guide using the handle thereby compressing the underlying batt material especially along the edge closest to the grip rail. While compressing the batt by applying pressure with one hand, the user can cut the batt using a suitable knife using the other hand guiding the knife along the edge of the guide. While any suitable knife can be utilized, embodiments of the guide work particularly well in combination with embodiments of the knife described herein.

For cuts longer than the length of the guide, the user merely relieves the pressure applied against the batt through the grip handle and slides or otherwise moves the guide's edge along the line to be cut.

For cuts lengthwise on batt insulation, the straightedge rule body cutting guide may affect the same compression of the batt, and allow for a quicker process due to less re-positioning of the cutting guide. Furthermore, a 48 inch long straightedge rule cutting guide may allow a cut across the width of a 48 inch wide sheet of rigid foam board material with only a single placement of the cutting guide, while resisting spinning around the grasping hand. Likewise, a 96 inch long straightedge rule cutting guide may allow a cut along the length of a 96 inch long sheet of rigid foam board material with only a single placement of the cutting guide and minimal movement of the grasping hand.

As can be appreciated, use of the guide is not limited to fibrous batts, but rather can be used as a layout, marking and cutting guide for any flat materials. The elevated handle facilitates moving the guide around a piece of flat material quickly and easily offering advantages over traditional rulers and squares.

Alternative Variation and Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A cutting guide for use with a knife for cutting fibrous and/or thick sheet materials, the guide comprising:

a rectangular body having a generally horizontally-disposed top side intersecting with left and right longitudinal sides that extend downwardly from the top side at a side angle of at least 30 degrees and terminate in respective left and right longitudinal bottom edges, the rectangular body having first rule markings on its top surface proximate one or both the left and right longitudinal sides; and a grip rail assembly comprising a grip rail elevated above the rectangular body by a two or more of elevating spacers attached to the grip rail and the rectangular body, the grip rail being configured to be held in a hand of a person and being substantially parallel to the right longitudinal side.

2. The cutting guide of claim 1, wherein the rectangular body is in the form of a rectangular frame having an open interior framed by the top side.

3. The cutting guide of claim 2, wherein the top side intersects with opposing first and second lateral sides that extend downwardly from the top side at angle and terminate in respective first and second lateral bottom edges, ends of the first and second lateral sides intersecting with ends of the left and right longitudinal sides.

4. The cutting guide of claim 3, wherein the rectangular body has second rule markings on its top surface proximate the first and second lateral sides.

5. The cutting guide of claim 2, wherein the elevating spacers comprise a plurality of struts, the struts attached to and extending upwardly from the rectangular frame on first strut ends and being attached to the grip rail at second strut ends.

6. The cutting guide of claim 1, wherein the rectangular body is in the form of a u-shaped straightedge body with the left and right longitudinal sides extending substantially orthogonally downwardly from respective intersections with the top side.

7. The cutting guide of claim 6, wherein the straightedge body has a straightedge length of at least 36 inches and a straightedge width of about 3.5 to 5 inches, and the left and right longitudinal sides each have a side width of at least 0.50".

8. The cutting guide of claim 7 wherein the straightedge length is about 48" and the straightedge width is about 4".

9. The cutting guide of claim 6, wherein the elevating spacers comprise at least first and second elevating blocks that support a bottommost portion of the grip rail above the top side at least 0.75", and a rightmost portion of the grip rail is spaced about at least 1.75" from the right longitudinal edge.

10. The cutting guide of claim 9, wherein the grip rail assembly is centered longitudinally on the rectangular body with the first and second elevating blocks being spaced apart a distance of about 60% of a longitudinal length of the rectangular body.

11. The cutting guide of claim 1, wherein at least the right longitudinal bottom edge comprises an inwardly facing bevel.

12. The cutting guide of claim 11, further comprising a non-skid insert and/or element attached to the left longitudinal side.

13. The cutting guide of claim 1, wherein the grip rail is positioned laterally closer to one of the right and left longitudinal sides relative to the other of the right and left longitudinal sides.

14. The cutting guide of claim 1, wherein the grip rail is generally cylindrical or ovular and has an effective diameter of about 1-2 inches.

15. The cutting guide of claim 1, wherein the grip rail includes a cushioning element comprising an outside surface of the grip rail.

16. In combination, the cutting guide of claim 1 and a knife, the knife comprising:

a blade having an elongated substantially linear blade edge and defining a blade plane; and a knife grip coupled with the blade, the grip having a grip longitudinal length, a grip leading edge located in the blade plane, a grip top end and a grip bottom end, and defining a grip line and a grip intersection point;

wherein an intersection angle made between a projection line defined by the blade edge and the blade line is between 70 and 89 degrees with the blade line being canted rearwardly, and the grip intersection point occurs at a location at or below a center point of the grip line.

17. A method of using the combination of claim 16 to cut a fibrous batt, the method comprising:

placing the cutting guide against the fibrous batt and aligning the right longitudinal edge with a desired cutline;

while holding the cutting guide at the grip rail with one hand, compressing the fibrous batt at the cutline by applying downwardly pressure to the cutting guide through the grip rail;

while holding the knife by the knife grip in another hand, positioning the knife blade against an edge of the fibrous batt along the right longitudinal side with the angle between the blade edge and a top surface of the fibrous batt being about 35 degrees; and pulling the knife through the fibrous batt to cut it.

18. The cutting guide of claim 1 wherein:

the rectangular body in the form of a u-shaped straightedge body having a straightedge length of about 48" and a straightedge width of about 4" with the left and right longitudinal sides extending substantially orthogonally downwardly from respective intersections with the top side with each side having a width of at least 0.50";

the right longitudinal bottom edge comprises an inwardly facing bevel;

the elevating spacers comprise at least first and second elevating blocks that support a bottommost portion of the grip rail above the top side at least 0.75", and a rightmost portion of the grip rail is spaced about at least 1.75" from the right longitudinal side;

the grip rail assembly is centered longitudinally on the rectangular body with the first and second elevating blocks being spaced apart a distance of about 60% of a longitudinal length of the rectangular body; and the cutting guide further comprises a non-skid elastomeric and/or rubber non-skid insert and/or element attached to the left longitudinal side.

19. The cutting guide of claim 1 wherein:

the rectangular body is in the form of a rectangular frame having an open interior framed by the top side;

the top side intersects with opposing first and second lateral sides that extend downwardly from the top side at angle and terminate in respective first and second lateral bottom edges, ends of the first and second lateral sides intersecting with ends of the left and right longitudinal sides;

the rectangular body has additional rule markings on its top surface proximate the first and second lateral sides;

at least the right and left longitudinal bottom edges each comprise an inwardly facing bevel;

the elevating spacers comprise a plurality of struts, the struts attached to and extending upwardly from the rectangular frame on first strut ends and being attached to the grip rail at second strut ends; and the grip rail is positioned laterally closer to one of the right and left longitudinal sides relative to the other of the right and left longitudinal sides.

* * * * *